(12) United States Patent
Zhang et al.

(10) Patent No.: US 9,891,454 B2
(45) Date of Patent: Feb. 13, 2018

(54) MULTIPLE GLAZING WITH VARIABLE DIFFUSION BY LIQUID CRYSTALS AND METHOD OF MANUFACTURE THEREOF

(71) Applicant: CARDINAL IG COMPANY, Eden Prairie, MN (US)

(72) Inventors: Jingwei Zhang, Massy (FR); Patrick Gayout, Villemomble (FR)

(73) Assignee: Cardinal IG Company, Eden Prairie, MN (US)

( * ) Notice: Subject to any disclaimer, the term of this patent is extended or adjusted under 35 U.S.C. 154(b) by 289 days.

(21) Appl. No.: 14/369,564

(22) PCT Filed: Dec. 27, 2012

(86) PCT No.: PCT/FR2012/053088
§ 371 (c)(1),
(2) Date: Jun. 27, 2014

(87) PCT Pub. No.: WO2013/098527
PCT Pub. Date: Jul. 4, 2013

(65) Prior Publication Data
US 2014/0375915 A1    Dec. 25, 2014

(30) Foreign Application Priority Data
Dec. 29, 2011    (FR) ...................................... 11 62540

(51) Int. Cl.
*G02F 1/1333* (2006.01)
*G02F 1/1339* (2006.01)
(Continued)

(52) U.S. Cl.
CPC ...... *G02F 1/1313* (2013.01); *B32B 17/10504* (2013.01); *E06B 9/24* (2013.01);
(Continued)

(58) Field of Classification Search
CPC ......... B32B 17/10504; B32B 17/10293; G02F 1/1334; G02F 1/1339; G02F 1/1343; G02F 1/1341; G02F 1/13439; E06B 2009/2464
See application file for complete search history.

(56) References Cited

U.S. PATENT DOCUMENTS

| 3,963,324 A | 6/1976 | Fergason et al. |
| 5,142,644 A | 8/1992 | VanSteenkiste et al. |
(Continued)

FOREIGN PATENT DOCUMENTS

| CN | 101694555 A | 4/2010 |
| DE | 3402518 A1 | 8/1985 |
(Continued)

OTHER PUBLICATIONS

PCT/FR2012/053088, International Preliminary Report on Patentability dated Jul. 10, 2014, 18 pages (including both French Language version and English Language translation).
(Continued)

*Primary Examiner* — Huyen Ngo
(74) *Attorney, Agent, or Firm* — Fredrikson & Byron, P.A.

(57) ABSTRACT

A multiple glazing with variable scattering by liquid crystals can have first and second flat float glass sheets held on the edge of their internal faces by a joint made of a given joint material. In some examples, the glazing also includes first and second electrodes and a layer of liquid crystals with an average thickness E between 5 and 15 μm. The thickness of each of the first and second glass sheets may be less than or equal to 6.5 mm and each of the internal faces coated with the first and second electrodes may have a dioptric defect score, expressed in millidiopters, of less than or equal to 2+2E/3, where the thickness E of the liquid crystals is in μm.

7 Claims, 4 Drawing Sheets

Figure 1:
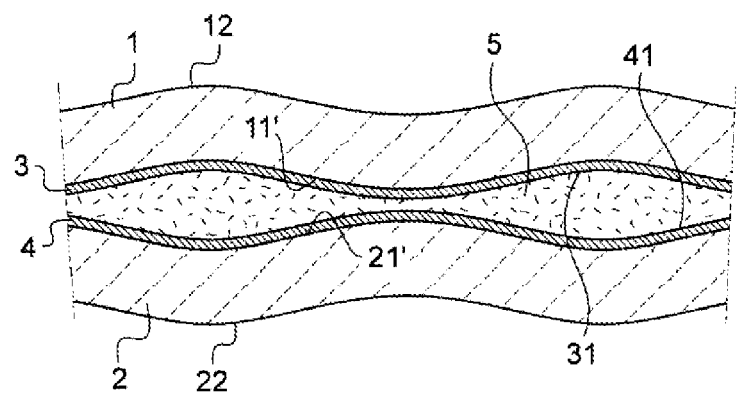

(51) Int. Cl.
*G02F 1/13* (2006.01)
*G02F 1/1334* (2006.01)
*B32B 17/10* (2006.01)
*E06B 9/24* (2006.01)
*G02F 1/1343* (2006.01)
*G02F 1/1341* (2006.01)
*E06B 3/667* (2006.01)
*E06B 3/677* (2006.01)

(52) U.S. Cl.
CPC .......... *G02F 1/1334* (2013.01); *G02F 1/1339* (2013.01); *G02F 1/13439* (2013.01); *E06B 3/667* (2013.01); *E06B 3/6775* (2013.01); *E06B 2009/2464* (2013.01); *G02F 1/1341* (2013.01); *G02F 2001/133302* (2013.01)

(56) References Cited

U.S. PATENT DOCUMENTS

| | | | |
|---|---|---|---|
| 5,408,353 | A | 4/1995 | Nichols et al. |
| 5,686,017 | A | 11/1997 | Kobayashi et al. |
| 5,691,795 | A | 11/1997 | Doane et al. |
| 5,958,290 | A | 9/1999 | Coates et al. |
| 6,184,954 | B1 * | 2/2001 | Inoue .................. G02F 1/1339 349/153 |
| 6,271,899 | B1 | 8/2001 | Lewis et al. |
| 6,295,102 | B1 | 9/2001 | Higa et al. |
| 6,429,961 | B1 | 8/2002 | Harary et al. |
| 6,661,486 | B1 | 12/2003 | Faris et al. |
| 7,342,704 | B2 | 3/2008 | Yano |
| 7,525,604 | B2 | 4/2009 | Xue |
| 7,755,829 | B2 | 7/2010 | Powers et al. |
| 7,837,897 | B2 | 11/2010 | Zhang et al. |
| 8,102,478 | B2 | 1/2012 | Xue |
| 8,187,682 | B2 | 5/2012 | Albrecht et al. |
| 8,934,078 | B2 | 1/2015 | Gayout |
| 9,229,279 | B2 * | 1/2016 | Ahn ..................... G02F 1/1339 |
| 9,400,411 | B2 * | 7/2016 | Poix .................. B32B 17/10045 |
| 2001/0033400 | A1 | 10/2001 | Sutherland et al. |
| 2002/0012160 | A1 | 1/2002 | Kase et al. |
| 2003/0193709 | A1 | 10/2003 | Mallya et al. |
| 2004/0160538 | A1 | 8/2004 | Li et al. |
| 2005/0211699 | A1 | 9/2005 | Faris et al. |
| 2009/0068455 | A1 | 3/2009 | Albrecht et al. |
| 2009/0103027 | A1 | 4/2009 | Hughes et al. |
| 2009/0219603 | A1 | 9/2009 | Xue |
| 2009/0290078 | A1 | 11/2009 | Yang et al. |
| 2010/0105276 | A1 | 4/2010 | Yoshida |
| 2010/0118380 | A1 | 5/2010 | Xue |
| 2010/0279125 | A1 | 11/2010 | Buyuktanir et al. |
| 2010/0294679 | A1 | 11/2010 | Griffiths et al. |
| 2011/0102730 | A1 | 5/2011 | Lee et al. |
| 2013/0093969 | A1 | 4/2013 | Li et al. |

FOREIGN PATENT DOCUMENTS

| | | |
|---|---|---|
| DE | 102006054011 A1 | 5/2008 |
| EP | 1927640 A1 | 6/2008 |
| EP | 2128688 A1 | 12/2009 |
| EP | 2256545 B1 | 11/2013 |
| JP | H02055318 A | 2/1990 |
| JP | H02073140 A | 3/1990 |
| JP | H03163520 A | 7/1991 |
| JP | H03255422 A | 11/1991 |
| JP | H05-088149 A | 4/1993 |
| JP | H05-150228 A | 6/1993 |
| JP | H06-331964 A | 12/1994 |
| JP | H08-022013 A | 1/1996 |
| JP | H08095069 A | 4/1996 |
| JP | H08-297298 A | 11/1996 |
| JP | H11-295704 A | 10/1999 |
| JP | 2000515648 A | 11/2000 |
| JP | 2001091931 A | 4/2001 |
| JP | 2001133795 A | 5/2001 |
| JP | 2001147432 A | 5/2001 |
| JP | 2002006325 A | 1/2002 |
| JP | 2002541515 A | 12/2002 |
| JP | 2006234885 A | 9/2006 |
| JP | 2009157335 A | 7/2009 |
| JP | 2010134246 A | 6/2010 |
| JP | 2012030980 A | 2/2012 |
| WO | 9219695 A2 | 11/1992 |
| WO | 9805998 A1 | 2/1998 |
| WO | 9830653 A1 | 7/1998 |
| WO | 2009072670 A1 | 6/2009 |
| WO | 2010005853 A1 | 1/2010 |
| WO | 2012045973 A1 | 4/2012 |
| WO | 2013098522 A1 | 7/2013 |

OTHER PUBLICATIONS

Pilkington Architectural Product Guide 2008, Dec. 31, 2008, 58 pages.
International Patent Application No. PCT/FR2011/051990, International Search Report mailed Dec. 9, 2011, 6 pages (including 3 pages English translation).
Chen et al., "Electro-Optical Properties of Polymer Stabilized Cholesteric Texture Normal-Mode Light Shutter From Flexible Monomers," ALCOM Tech Report XI, 2000, pp. 223-229.
"Liquid Crystal Glass," retrieved from http://www.glazette.com/Glass-Knowledge-Bank-70/Liquid-Crystal-Glass.html on Oct. 1, 2013, 2 pages.
"Switchable Intelligent Glass—SGG Priva-lite Electrochromatic Glass," Saint Gobain Glass India, retrieved from http://in.saint-gobain-glass.com/b2c/default.asp?nav1=pr&nav2=single%20pane&id=18978 on Oct. 1, 2013, 1 page.
"Transparent Display," Kent Optronics, retrieved from http://kentoptronics.com/transparent.html on Oct. 1, 2013, 1 page.
International Search Report for International Application No. PCT/FR2012/053088 mailed Apr. 12, 2013, 5 pages.
International Search Report for International Application No. PCT/FR2012/053083 mailed Apr. 3, 2013, 7 pages.

* cited by examiner

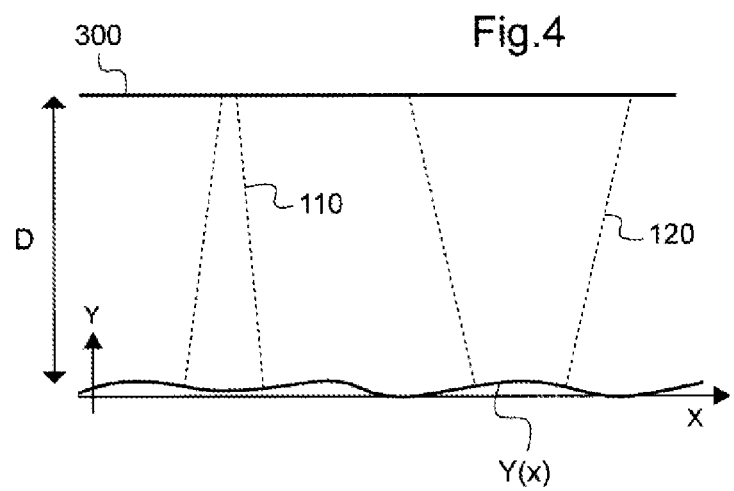
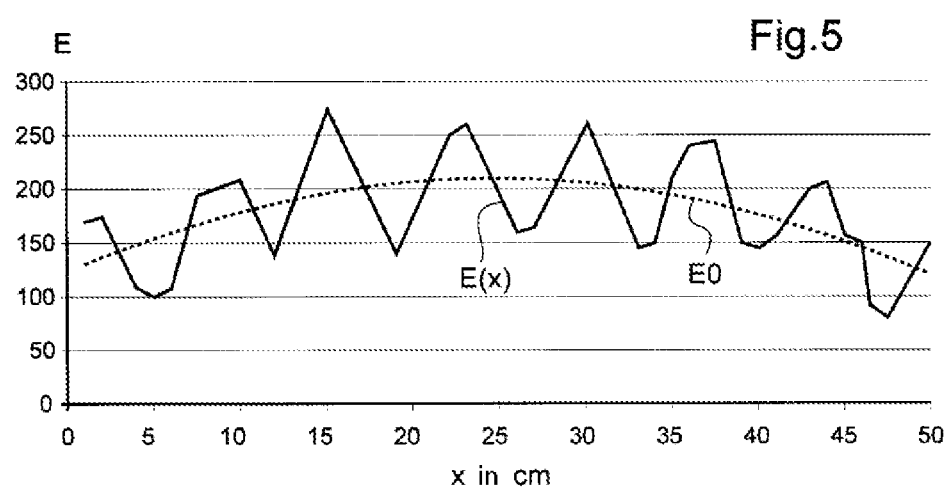

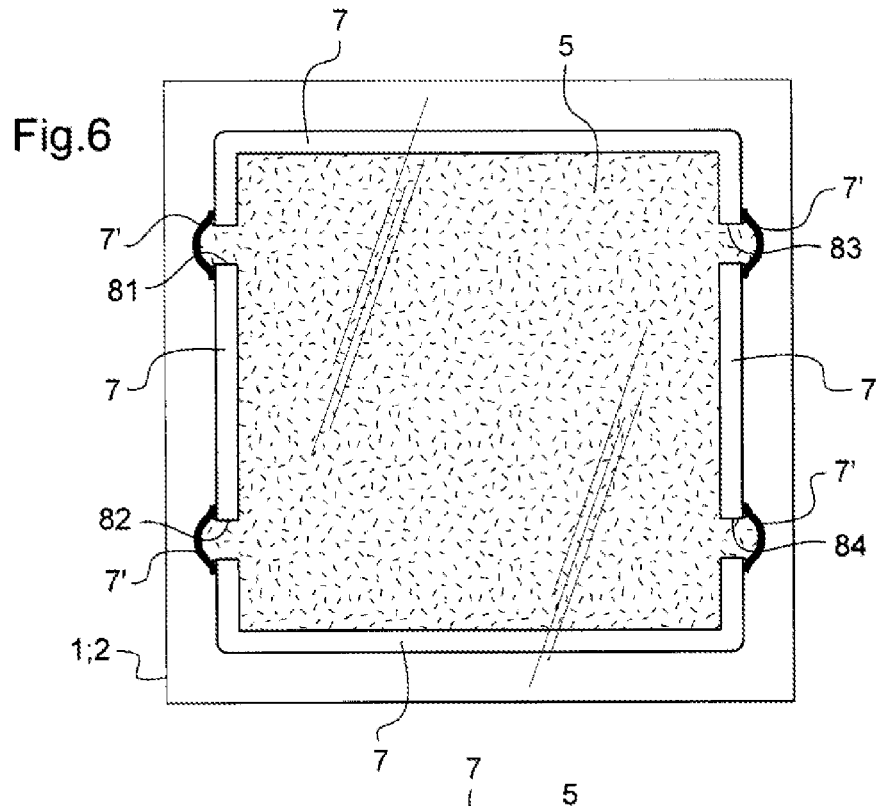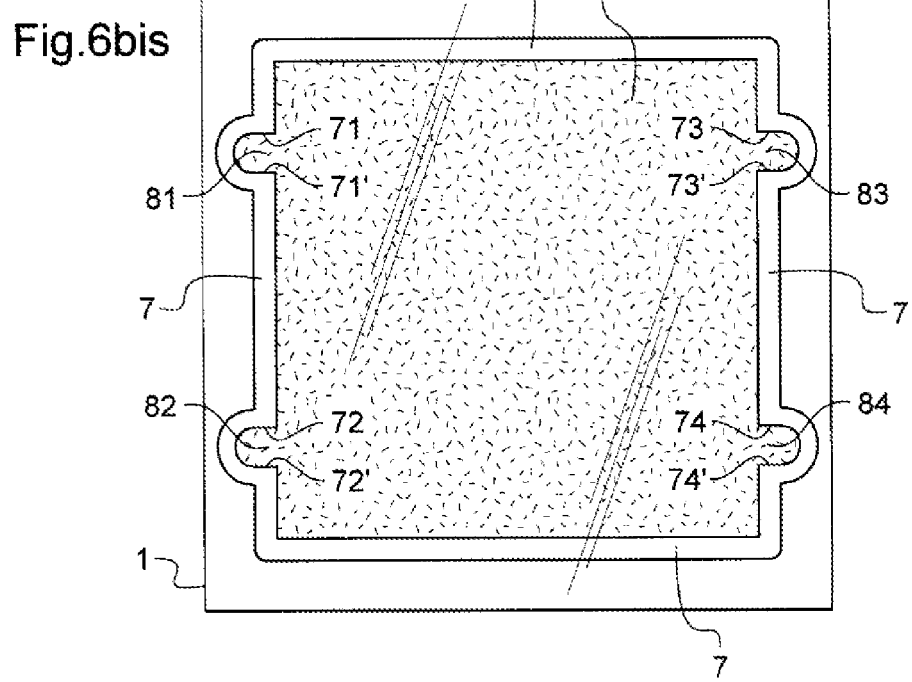

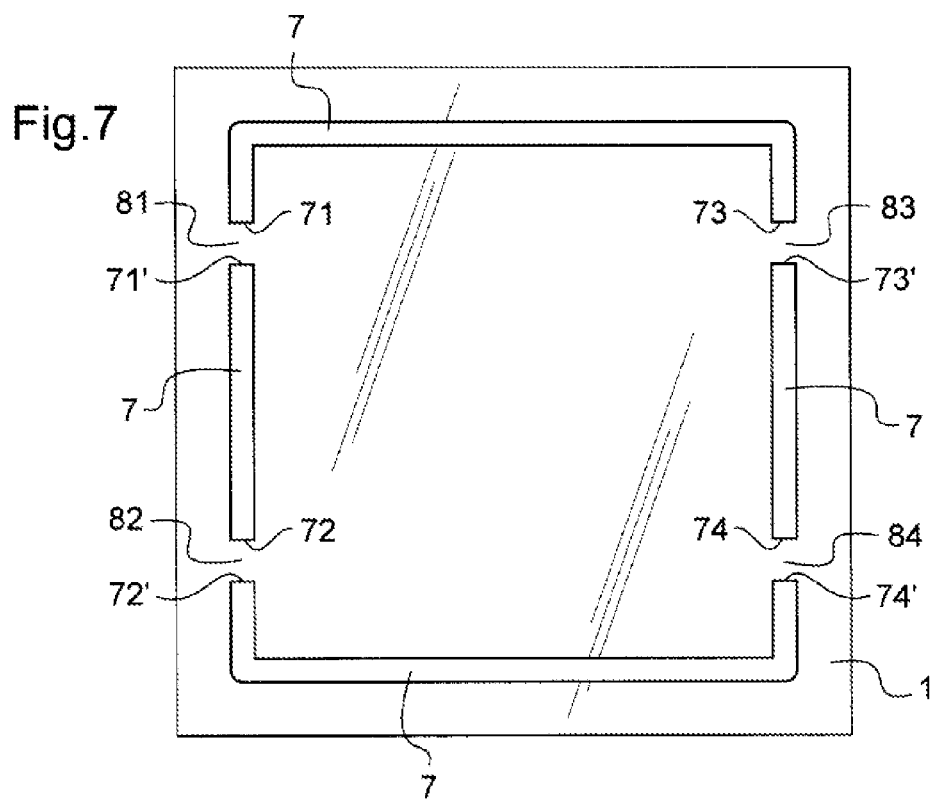

MULTIPLE GLAZING WITH VARIABLE DIFFUSION BY LIQUID CRYSTALS AND METHOD OF MANUFACTURE THEREOF

CROSS-REFERENCE

This application is a 35 U.S.C. 371 national stage filing from International Application No. PCT/FR2012/053088, filed Dec. 27, 2012 and claims priority to France Application No. 1162540 filed Dec. 29, 2011. The entire contents of these applications are incorporated herein by reference.

The invention relates to the field of electrically controllable glazing having variable optical properties, and it more particularly concerns glazing with variable scattering by liquid crystals, provided with a layer of liquid crystals between two glass panes and alternating reversibly between a transparent state and a non-transparent state by application of an alternating electric field.

Glazings are known, certain characteristics of which can be modified under the effect of a suitable electrical supply, more particularly the transmission, absorption, reflection at certain wavelengths of electromagnetic radiation, particularly in the visible and/or infrared ranges, or alternatively the scattering of light.

Electrically controllable glazing with liquid crystals can be used everywhere, both in the construction sector and in the motor vehicle sector wherever viewing through the glazing needs to be prevented at given times.

Document WO 9805998 discloses multiple glazing with liquid crystals, comprising:
 two 1 m² float glass sheets with thicknesses of 6 mm sealed on the edge of their internal faces by an adhesive sealing joint made of epoxy resin,
 two electrodes made of electrically conductive layers based on $SnO_2$:F, directly on the internal faces of the glass panes,
 a 15 µm layer of liquid crystals based on PSCT "Polymer Stabilized Cholesteric Texture" and incorporating spacers in the form of 15 µm glass beads directly on the electrodes.

Figure 2:
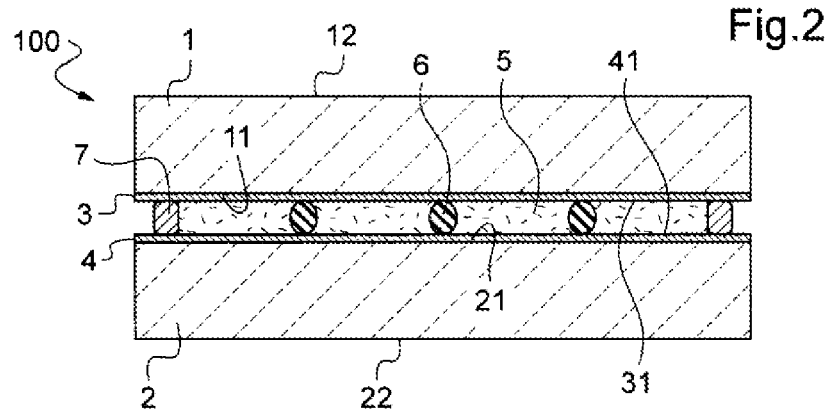

The glass panes are placed in contact by lowering the second glass pane with an inclined angle onto the second glass pane in order to enclose the layer of liquid crystals, as shown in FIG. 2 and described on page 8.

Figure 3:
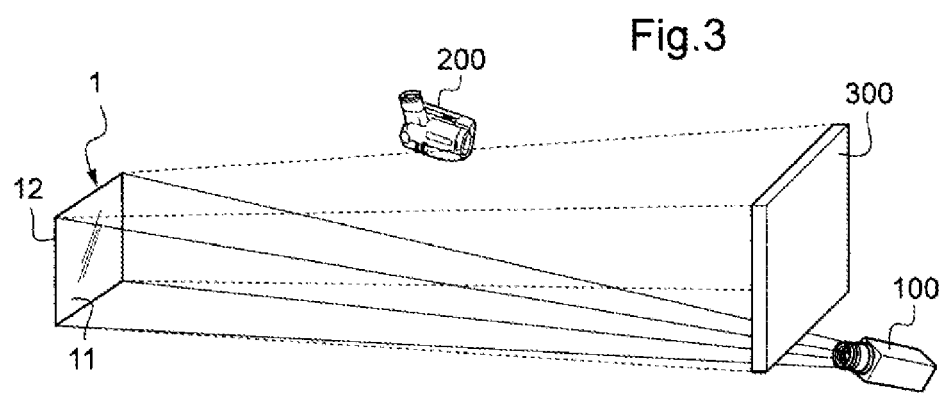

Subsequently, after formation of the sealing joint, the glass panes are pressed by passing between two rollers in order to distribute the layer of liquid crystals while evacuating the trapped air, as shown in FIG. 3.

The optical performance and the reliability of this glazing can be improved. Furthermore, such glazing is expensive, heavy, bulky and in particular difficult to handle.

It is an object of the invention to develop reliable multiple glazing with liquid crystals, which has satisfactory optical performance and is preferably compact.

To this end, the present invention firstly provides multiple glazing with variable scattering by liquid crystals having:
 first and second flat float glass sheets held at the edge of their internal faces by a joint, in particular made of a given joint material, in particular an essentially organic joint material,
 on the internal faces of the first and second glass sheets, first and second electrodes in the form of transparent electrically conductive layers provided with a power supply,
 and, on the first and second electrodes, a layer containing liquid crystals in polymer material (or polymer matrix), the layer of liquid crystals alternating reversibly between a transparent state and a translucent state by application of an alternating electric field, which layer has an average thickness E of between 5 and 15 µm, including 5 µm and excluding 15 µm; and preferably of 8 µm, better still from 10 µm to 14 µm, which layer of liquid crystals incorporates spacers, in particular transparent spacers.

Each of the first and second glass sheets has a thickness of less than or equal to 6.5 mm and each of the internal faces coated with the first and second electrodes has a dioptric defect score, expressed in millidioptres (or mdt), of less than or equal to 2+2E/3 where the thickness E of the liquid crystals is in µm.

Preference may be given to a thickness E of greater than or equal to 8 µm and even of greater than or equal to 10 µm, in order to more easily guarantee the optical performance.

The Applicant has discovered the relationship between the quality of the glass panes and the optical performance of the multiple glazing with liquid crystals with a particularly low thickness of liquid crystals.

Naturally, the thickness of the first glass sheet can be separate or equal to the thickness of the second glass sheet. The requirement with regard to the dioptric defect score is valid for each.

FIG. 1 shows, as comparative glazing, an assembly of two standard thin glass panes 10, 20, for example of 1.7 mm, facing one another and forming a space between them containing a layer of liquid crystals 5 with a thickness lowered to 12 µm. The internal surfaces 11', 21' have planarity defects, and the thickness of the liquid crystals is variable.

In the "off" state (translucent state), the light transmission closely related to the thickness of the layer of liquid crystals is therefore not uniform. The quality of the product is therefore unacceptable, because of the visually observable dark and light regions.

In order to ensure good optical uniformity, the coated glass panes should therefore have limited dioptric defects.

The glass panes according to the invention ensure a sufficiently uniform thickness of the layer of liquid crystals over the entire surface, and therefore little variation in its optical performance. This avoids a glazing reject rate and therefore improves its reliability.

We will define a dioptric defect and a measurement method below.

We can define the profile of the internal face of each glass sheet (coated or not) in question by y(x), where x denotes the position on the internal face. The variation of this profile can be characterized by the optical reflection power ORP, which is defined by the following relationship:

$$ORP_{(x)} = 2\frac{d^2 y_{(x)}}{dx^2} = 2y''_{(x)}$$

The variation of y(x) is due to the two phenomena:
 undulations of the sheet of glass,
 thickness defects (non-parallelism of the 2 faces of the glass sheet).

This quantity is expressed in dioptres ($m^{-1}$) for y(x) expressed in meters.

If the second derivative y"(x) is zero, this means that the internal face of the glass is perfectly flat; if the second derivative is less than 0, this means that the internal face of the glass is concave of the glass; and if the second derivative is greater than 0, this signifies that the internal face of the glass is convex.

The method for measuring the planarity y(x) of the internal face of the glass is a contactless optical measurement method, which consists in analysing the contrast at every point of a so-called umbrascopic image obtained by reflection of a homogeneous light source from the internal surface of the glass.

The unmeasured external face of the glass sheet is wetted with a liquid having an index similar to that of the glass, in order to eliminate any reflection of the light from this surface and keep only the image of the directly illuminated internal face.

The planarity is thus measured every millimeter over the illuminated surface of the internal face. Each point is quantified by a physical unit of optical power in millidioptres (mdt=dioptre/1000), similar to converging and diverging lenses.

The final planarity is quantified by a dioptric defect score, which corresponds to the standard deviation of all the measurements. This score, expressed in millidioptres (mdt), perfectly characterizes the planarity of the measured surface. The score increases when the planarity is degraded.

For a given dioptric defect score, the amplitude of the variation of y(x) also depends on the periodicity or pitch.

By way of example, for a sinusoidal profile y(x) with a pitch of 30 mm, a dioptric defect of 10 mdt corresponds to a profile variation of about +/−0.20 μm. In the worst case, the spatial variation of an assembly of two glass sheets (and therefore the thickness variation E of the liquid crystals) is then doubled, i.e. about +/−0.40 μm. For a defect with a pitch of 15 mm, the same 10 mdt dioptric defect corresponds to a profile variation of +/−0.05 μm, and the thickness variation E of the liquid crystals is therefore +/−0.10 μm in the worst case.

The pitch of dioptric defects of a sheet of float glass covers a range of from a few millimeters to a few tens of millimeters. Being closely linked with the uniformity of the thickness E of the liquid crystals, the uniformity of light transmission in the "off" state results from all the dioptric defects with all the pitches.

The uniformity of light transmission in the "off" state is also conditioned by the average thickness E of LC. The lower the thickness E is, the less a thickness variation can be tolerated. This is why, according to the invention, a score is established as a function of the average thickness.

The dioptric defects of float glass are principally linked with the rate of advance of the glass (drawing rate of the line). The greater the glass advance rate is, the greater the dioptric defects are. For a given capacity (or tonnage, daily) and a given raw width of glass, the glass advance rate is inversely proportional to the thickness of the glass sheet. Therefore, the thinner the glass sheet is, the higher the glass advance rate is and the greater the dioptric defects are.

Thus, it is not possible to use an arbitrary thickness because it is the dioptric quality of the glass which determines the possible thickness of the glass. The invention allows us, for example, to use the smallest possible thickness while guaranteeing the optical quality of the final product. For example, 2 mm glass panes may be selected so long as these glass panes are produced with a drawing rate which is low enough to ensure limitation of dioptric defects.

For a 6 mm glass pane, if the tonnage is too high, for example 2000 tonnes/day, the dioptric defects are too great for this range of low thicknesses of liquid crystals.

The glass of the first and/or second glass sheet may preferably have a light transmission $T_L$ of greater than or equal to 70%, preferably of greater than or equal to 80%, indeed even of greater than or equal to 90%. The glass is preferably transparent and colorless.

It can be a clear or extra clear mineral glass. A clear glass typically contains a content by weight of iron oxide of the order of 0.05% to 0.2%, while an extra-clear glass generally contains approximately 0.005% to 0.03% of iron oxide.

The glass of the first and/or of the second glass sheet can, however, be colored in its body by appropriate colorants, for example in blue, green, gray or bronze. It is generally preferable for the glass to have a color in transmission which is as neutral as possible, in particular in the grays. Use may very particularly be made of the range of colored glasses sold under the Parsol name (bronze, green or gray) by Saint-Gobain Glass.

The glass, in particular colored glass, may preferably have a light transmission $T_L$ of greater than or equal to 10%—for example in the context where the surroundings on the side of the external face (opposite the face with the electrode) are highly illuminated—, and is preferably greater than or equal to 40%.

The float glass is obtained in a known way by a process consisting in pouring the molten glass onto a bath of molten tin (float bath). In this case, the electrode can equally well be deposited on the "tin" face as on the "atmosphere" face of the glass. The terms "atmosphere" and "tin" faces are understood to mean the faces which have been respectively in contact with the atmosphere prevailing in the float bath and in contact with the molten tin. The tin face contains a small superficial amount of tin which has diffused into the structure of the glass.

The electrode in layer(s) has no significant influence on the dioptric defects. Thus, if a "bare" float glass is suitable, the glass coated with an electrode layer will also be suitable.

The electrode in the layer(s) is, for example:
  a stack of layers comprising at least one (thin) layer of silver between two (thin) dielectric layers (dielectric in the nonmetallic sense, typically metal oxide or nitride),
  a layer of transparent conductive oxide, referred to as TCO.

The TCO layer is preferably a layer of indium tin oxide (ITO). Other layers are possible, including the following (thin) layers:
  based on indium zinc oxide (known as "IZO" layers), on indium gallium zinc oxide (IGZO),
  based on doped zinc oxide, preferably doped with gallium or with aluminum (AZO, GZO), based on niobium-doped titanium oxide, based on cadmium or zinc stannate,
  based on fluorine-doped tin oxide ($SnO_2$:F), based on antimony-doped tin oxide.

It is also possible to add:
  one or more dielectric underlayers (dielectric in the nonmetallic sense, typically metal oxide or nitride) under the TCO layer, (underlayer directly on the glass),
  and/or one or more dielectric overcoats (dielectric in the nonmetallic sense, typically metal oxide or nitride) on the TCO layer (overcoat in contact with the layer of liquid crystals).

An underlayer or an overcoat is, for example, a thin layer (typically less than 150 nm).

The electrode in layer(s) (in particular a stack of thin layers, in particular with underlayer(s) and/or overcoat(s)) is preferably deposited by vacuum deposition (physical vapor deposition "PVD", chemical vapor deposition "CVD", and the like). (Magnetron) cathode sputtering deposition is preferred.

The electrode in layer(s) (in particular a stack of thin layers, in particular with underlayer(s) and/or overcoat(s)) thus has no significant influence on the dioptric defects. Thus, if a "bare" float glass is suitable, the float glass coated with such layers will also be suitable. Naturally, for the sake of simplicity and economy, it is preferable to select suitable float glasses rather than to have to smooth (polishing etc.) any glass obtained by another manufacturing method. The invention furthermore makes it possible to produce high-performance liquid-crystal multiple glazings with a width of more than 1 m.

In a preferred embodiment,
for a thickness E of less than 8 μm, one, indeed even each, of the first and second glass sheets has a thickness of between 4.5 mm and 5.5 mm inclusive of these values, in particular 4±0.2 μm, 5±0.2 μm, which are conventional thicknesses,
or
for a thickness E greater than or equal to 8 μm (and always less than 15 μm), one, indeed even each, of the first and second sheets has a thickness between 2.5 mm and 5.5 mm inclusive of these values, in particular 3±0.2 μm, 4±0.2 μm and 5±0.2 μm, in particular by production on a float line with a capacity of at least 550 tonnes/day and preferably limited to 900 tonnes/day.

Furthermore, the joint has a given width L and may preferably be interrupted in its width by one or more openings each defining lateral joint ends, and for each opening an additional material forms a bridge between the lateral ends of the joint, in particular consisting of the said joint material, thus forming material continuity.

In the multiple glazing with liquid crystals of the prior art, the joint used for sealing is continuous.

With one or more openings—supplemented with an additional material—according to the invention interrupting the joint of such multiple glazing with liquid crystals, the optical performance (in the off state) is improved by contributing, particularly in the edge regions of the layer of liquid crystals, to uniform distribution of the layer of liquid crystals.

A multiple glazing with liquid crystals multiple with variable diffusion by liquid crystals having:
first and second flat glass sheets held at the edge of their internal faces by a joint, in particular made of a given joint material, with one or more openings—supplemented with an additional material—,
on the internal faces of the first and second glass sheets, first and second electrodes in the form of transparent electrically conductive layers provided with an energy supply,
and, on the first and second electrodes, a layer containing liquid crystals in polymer material, the layer of liquid crystals alternating reversibly between a transparent state and a translucent state by application of an alternating electric field, which layer has an average thickness E of between 5 and 15 μm and even from 15 to 60 μm,
constitutes an invention per se.

In a preferred embodiment, however, it is coupled to the multiple glazing with liquid crystals with the thin layer of liquid crystals as defined above and with glass panes as defined above each having a limited dioptre score.

Furthermore, it is possible to use all the liquid-crystal systems known by the terms "NCAP" (Nematic Curvilinearly Aligned Phases" or "PDLC" (Polymer Dispersed Liquid Crystal) or "CLC" (Cholesteric Liquid Crystal) or "NPD-LCD" (Non-homogenous Polymer Dispersed Liquid Crystal Display).

These may furthermore contain dichroic colourants, particularly in solution in the droplets of liquid crystals. The scattering of light and the absorption of light by the systems can then jointly be modulated.

It is also possible to use, for example, gels based on cholesteric liquid crystals containing a small quantity of crosslinked polymer, such as those described in Patent WO-92/19695. More broadly speaking, "PSCTs" (Polymer Stabilized Cholesteric Texture) may therefore be selected.

It is possible to use multistable liquid crystals and in particular it is possible to use bistable smectic liquid crystals, for example as described in detail in Patent EP 2 256 545, which switch under the application of an alternating electric field in pulsed form and which remain in the switched state until the application of a fresh pulse.

Naturally, the liquid-crystal system may extend substantially over the entire surface of the glazing (except for the margins) or over (at least) one restricted region. The liquid-crystal system may be discontinuous, in a plurality of pieces (for example of the pixel type).

Multiple glazing with variable scattering by liquid crystals, as defined above, may be used as glazing in vehicles or buildings.

The glazing according to the invention may be used in particular:
as an internal partition (between two rooms or in an area) in a building, in a means of land, air or aquatic locomotion (between two compartments, in a taxi, etc.),
as a glazed door, a window, a ceiling, a tile (floor, ceiling),
as a rear-view mirror of a vehicle, side glazing, a roof of a means of land, air or aquatic locomotion,
as a projection screen,
as a shop frontage, a window in particular of a shop counter.

Naturally, the glazing according to the invention may form all or part of a partition and other window (such as a fanlight etc.).

By lowering the thickness of the layer (and thus the amount of encapsulated active mixture) below 15 μm, the material cost is reduced.

Furthermore, the spacers may preferably be made of a transparent plastic. The spacers determine (roughly) the thickness of the layer of liquid crystals. Preference is given, for example, to spacers made of polymethyl methacrylate (PMMA).

The spacers are preferably, as regards optical index, (substantially) equal to the optical index of (the matrix of) the layer of liquid crystals.

The spacers are, for example, in the form of beads.

The invention also relates to a method for producing multiple glazing with variable scattering by liquid crystals, as defined above, comprising the following steps:
formation of the joint, comprising application of the joint material (preferably essentially organic, in particular epoxy resin) on the first float glass sheet (at the border) provided with the first electrode,
(before or after formation of the joint) liquid deposition of the layer of liquid crystals with an average thickness E on the first float glass sheet provided with the first electrode and optionally on the second float glass sheet provided with the second electrode, after formation of the joint and deposition of the layer of liquid crystals, bringing the first and second glass sheets in contact, in particular by calendering or pressing, and before bringing the first and second glass sheets in contact, formation of the opening or the said openings of the joint, each defining lateral joint ends, by discontinuous application of the joint material and/or by continuous application of the joint material and the creation of interruptions forming the openings.

At least two openings are preferably positioned facing a first sheet edge (sheet with straight or curved edges) and preferably at least two other openings facing a second edge opposite the first edge, these edges corresponding to the edges of the direction of the calendering, in the case of calendering.

In the case of pressing in particular, at least two openings are also positioned facing a third edge adjacent to the first edge (and to the second edge) and at least two other openings facing a fourth edge opposite the third edge.

The method may furthermore comprise application of the additional material, forming a bridge between the lateral ends of the joint.

The additional material may consist of the said joint material, thus forming material continuity, preferably essentially organic, in particular epoxy resin.

Preferably, the width between the lateral ends of the joint may be at least 5 mm, for example 10 mm.

Other details and features of the invention will become apparent from the following detailed description, which is provided with reference to the appended drawings in which:

FIG. 1 (already described) represents a schematic sectional view of reference multiple glazing with variable scattering by liquid crystals, not according to the invention, FIG. 2 represents a schematic sectional view of multiple glazing with variable scattering by liquid crystals of low thickness in a first embodiment according to the invention, FIG. 3 shows the layout diagram of the measurement of the dioptric defect score, FIG. 4 shows the principle of the formation of an umbrascopic image on a screen on the basis of a planarity profile Y(x) of the glass, FIG. 5 shows an example of a local illumination profile E(x) and an average illumination profile E0(x), FIG. 6 represents a schematic view from below of multiple glazing with variable scattering by liquid crystals according to the invention, showing in particular the joint and the openings, FIG. 6bis represents a schematic plan view of the multiple glazing with variable scattering by liquid crystals, showing in particular the joint and the openings, in a variant of FIG. 6, FIG. 7 represents a schematic plan view of the manufacture of the multiple glazing with variable scattering by liquid crystals according to the invention, showing in particular the joint and the openings.

The exemplary embodiment represented in FIG. 2 shows the design of the liquid-crystal multiple glazing according to the invention in a first embodiment.

On two sheets of float glass 1 and 1', electrically conductive layers 3, 4 with a thickness of about 20 to 400 nm, having external surfaces 21, 31 and made for example of indium tin oxide (ITO), are arranged on the internal faces 11, 21. The ITO layers have an electrical sheet resistance of between 5Ω/□ and 300Ω/□. Instead of layers made of ITO, other layers of electrically conductive oxide or layers of silver whose sheet resistance is comparable may also be used for the same purpose.

The layer 5 of liquid crystals, which may have a thickness of about 5 to 15 μm (excluded), is placed between the electrode layers 3 and 4. The thickness is preferably at least 8 μm and even 10 μm (approximately).

The layer 5 of liquid crystals contains spherical spacers. The spacers 6 consist of a transparent polymer.

In order to ensure uniformity of the thickness E of the liquid-crystal layer 5 and thus ensure the optical performance of the glazing with liquid crystals, glass panes 1, 1' with their electrodes 3, 4 are each selected with a dioptric defect score according to the invention, which score is measured by umbrascopy in reflection.

The basic principle is associated with the geometrical optics. The diagram of the layout is represented in FIG. 3.

From a very thin source, such as a projector 100, a light flux is projected onto the face of the glass sheet 11 (coated or not with the electrode) intended to be the internal face. A projected image is observed on a screen 300 after reflection from the internal face 11 of the glass sheet. This image is acquired by a digital camera 200 in order to be processed. The reflection from the second face 12 is neutralized by using a wetted black fabric which is placed behind the glass pane 1 and on which the glass is bonded by capillary effect.

FIG. 4 indicates the principle of the formation of an umbrascopic image on the screen 300 on the basis of a planarity profile Y(x) of the glass. A concave region on the glass pane (convergent defect) causes concentration of the incident reflected light 110 and therefore local over-illumination on the screen 300. A complex region on the glass (divergent defect) causes spreading of the incident reflected light 120 and therefore local under-illumination on the screen 300.

FIG. 5 shows an example of a local illumination profile E(x) and an average illumination profile E0(x).

When the local illumination E(x) is equal to the average illumination E0(x), the contrast is zero and consequently Y"(x)=0 and the optical power is zero.

When the local illumination E(x) is greater than the average illumination E0(x), the contrast is negative and Y"(x)<0. A convergent defect is therefore involved, which corresponds to a concavity on the glass pane.

When the local illumination E(x) is less than the average illumination E0(x), the contrast is positive and Y"(x)>0. A divergent defect is therefore involved, which corresponds to a convexity on the glass pane.

Knowing that the planarity variations are more significant in the direction of the overall width, in order to explain the operating principle of the apparatus we will consider a planarity profile in the plane perpendicular to the casting direction and perpendicular to the surface of the glass.

It can be shown on the basis of the laws of geometrical optics and conservation of energy that there is a relationship between the illumination E(x) measured on the screen corresponding to an abscissa point x on the glass pane and the profile Y(x) of the surface of the glass pane.

Certain geometrical simplifications made on the basis of the following aspects: the layout is in quasi-normal reflection and the source is considered to be a point source, give the following relationship:

$$\frac{d^2Y(x)}{dx^2} = \frac{1}{D}\left(\frac{E_0}{E(x)} - 1\right)$$

with:
Y(x): profile of the glass pane
D: the glass pane—screen distance
$E_0$: average illumination at x (that which would be obtained without a planarity defect)

Let the optical reflection power ORP (in dioptres) be:

$$ORP = 2 \times \frac{d^2 Y(x)}{dx^2} \approx 2 \times \frac{C(x)}{D}$$

with the contrast C(x) such that $$C(x) = \frac{E_0 - E(x)}{E(x)}.$$

The contrast corresponds to the visual perception of the "linearity" (here in dashes because a profile rather than a surface is being considered) observed on the umbrascopic image projected onto the screen.

Processing software calculates the contrast, and therefore the optical reflection power ORP, for each pixel of the image.

The dioptric defect score (in millidioptres) reflects the homogeneity of the optical powers and is in fact the standard deviation σ of the distribution of the optical reflection powers over the internal face, defined by the relationship:

$$\sigma = \sqrt{\overline{(O.P.r^2)_{i,j}} - \overline{(O.P.r)_{i,j}^2}}$$

with
$\overline{(O.P.r^2)_{i,j}}$: mean square of the optical powers over the entire internal face
$\overline{(O.P.r)_{i,j}^2}$: square of the mean of the optical powers over the entire internal face.

The score must be less than or equal to 2+2E/3 in order to ensure a sufficient optical quality in transmission, that is to say a good homogeneity of the light transmission in the "off" state.

for a thickness of liquid crystals of 12 μm, a score of less than equal to 10 is needed.

For a thickness of liquid crystals of 10 μm, a score of less than equal to 8.7 is needed.

For a thickness of liquid crystals of 8 μm, a score of less than equal to 7.3 is needed.

By way of example, with a float line having a capacity of 600 tonnes/day with a raw glass width of 3.5 m:
 the score of the 2.1 mm glass is less than 22 mdt,
 the score of the 3 mm glass is less than 11 mdt,
 the score of the 4 mm glass is less than approximately 8 mdt,
 the score of the 6 mm glass is less than or equal to approximately 5 mdt.

Furthermore, it is also possible to use known compounds for the layer of liquid crystals, for example the compounds described in Document U.S. Pat. No. 5,691,795. The liquid-crystal compound from Merck Co., Ltd, marketed under the brand name "Cyanobiphenyl Nematic Liquid Crystal E-31 LV" has also proven particularly suitable. In the case of this embodiment, this product is mixed in a ratio of 10:2 with a chiral substance, for example 4-cyano-4'-(2-methyl)butylbiphenyl, and this mixture is mixed in a ratio of 10:0.3 with a monomer, for example 4,4'-bisacryloylbiphenyl, and with a UV initiator, for example benzoin methyl ether. The mixture prepared in this way is applied onto one of the coated glass sheets. After curing of the layer of liquid crystals by irradiation with a UV light, a polymer network is formed in which the liquid crystals are incorporated.

For the layer of liquid crystals, it is possible to use PDLCs such as the compounds 4-((4-ethyl-2,6-difluorophenyl)-ethinyl)-4'-propylbiphenyl and 2-fluoro-4,4'-bis(trans-4-propyl-cyclohexyl)-biphenyl, for example marketed by the company Merck under the reference MDA-00-3506.

On the edge, the layer of liquid crystals is sealed by an adhesive joint 5 which simultaneously serves to firmly and permanently bond the glass sheets 1, 1'.

The adhesive joint material contains an epoxy resin.

As shown in FIG. 6, the joint 7 has a given width L and is interrupted in its width by a plurality of openings 81 to 84, each defining lateral joint ends 71 to 74'.

More precisely, the joint 7 is interrupted in its width by two openings 81 to 82 facing a first edge of the glazing and by two other openings 83, 84 facing a second edge opposite to the first edge, these edges corresponding to the edges of the assembly direction of the glass panes, preferably by calendering.

For each opening, an additional material 7' forms a bridge between the adjacent lateral ends of the joint, in particular consisting of the said joint material, thus forming material continuity as shown in FIG. 6bis.

In the initial state ("off" state), that is to say before the application of an electrical voltage, this liquid-crystal glazing 100 is translucent, that is to say it optically transmits but is not transparent. As soon as the current is connected up, the layer of liquid crystals changes under the effect of the alternating electric field into the transparent state, that is to say the state in which viewing is no longer prevented.

The electrically controllable glazing with liquid crystals is produced by using a method described in detail below.

In an industrial installation for continuous coating, by using the method of magnetic field enhanced reactive sputtering, with float glass sheets according to the invention, are coated in successive sputtering chambers with a layer of ITO having an approximate thickness of 100 nm.

Two separate glass sheets of the same size and having the desired dimensions are cut from a large sheet of glass coated in this way and are prepared for continuation of the processing.

The two separate glass sheets cut to the desired dimensions then firstly undergo a washing operation.

The liquid-crystal layer mixed with the spacers is then applied onto one of the two glass sheets processed in this way.

Since the two separate glass sheets are subsequently connected permanently and closely to one another on their edges by a joint, the edge part of the glass sheet 1 is not coated over a width of about 2 to 10 mm.

The coating with the liquid-crystal compound is carried out with the aid of an operation referred to as drop-by-drop filling. In order to carry out the operation, a drop-by-drop pouring apparatus is used which makes it possible to deposit drops of liquid crystals onto a glass substrate, the quantity poured being finely adjustable.

In another embodiment of the method, in order to print the layer of liquid crystals, a screen printing fabric is used with a mesh the width of which is about 20 to 50 μm and the thread diameter of which is about 30 to 50 μm.

The adhesive layer forming the joint 7 is likewise applied directly along the edge of the glass sheet 24 before or after deposition of the layer of liquid crystals. It may have a width of, for example, from 2 to 10 mm.

As shown by FIG. 7, the formation the plurality of a plurality of openings 81 to 84 in the joint is provided, with a size and distribution adapted to remove the excess liquid-crystal layer, the openings 81 to 84 each defining two adjacent lateral ends 71 to 74' of the joint 7.

Furthermore, in order to do this, the application of the joint material is either discontinuous or is continuous then followed by creation of openings (by removing material 7).

This is followed by application of the additional material 7' forming a bridge between the lateral ends of the joint 71 to 74', preferably consisting of the said joint material, thus forming material continuity.

When the two separate glass sheets have thus been pressed against one another, the adhesive layer 7 is compressed to the thickness E of the layer of liquid crystals.

The openings 81 to 84 therefore serve:
to remove the excess liquid-crystal layer, and therefore to better control the layer thickness and thus avoid a loss of optical quality,
to degas the layer of liquid crystals in order to avoid the subsequent formation of bubbles in the layer and thus again to avoid a loss of optical quality.

At least two openings are preferably positioned on the front edge of the calendering and at least two openings on the rear edge of the calendering.

The width of the lateral ends is, for example, 10 mm. The more viscous the layer of liquid crystals is, the greater is the number of openings used.

The calendering operation is subsequently carried out, or as a variant the pressing.

If the layer of liquid crystals consists of a mixture of liquid crystals and a monomer, the polymerization operation is then carried out by irradiation with UV light.

The invention claimed is:

1. A multiple glazing with variable scattering by liquid crystals having:
    a first float glass sheet having a first internal face and a second flat float glass sheet having a second internal face, the first and second float glass sheets being held at an edge of the first and second internal faces by a joint,
    first and second electrodes on respective first and second internal faces, the first and second electrodes being in the form of transparent electrically conductive layers provided with a power supply, and
    on the first and second electrodes, a layer containing liquid crystals in polymer material, the liquid crystals being configured to alternate reversibly between a transparent state and a translucent state by application of an alternating electric field, wherein the layer containing liquid crystals has an average thickness E of between 5 and 15 micrometers (μm), including 5 μm and excluding 15 μm, and the layer containing liquid crystals incorporates spacers,
    wherein each of the first and second float glass sheets has a thickness of less than or equal to 6.5 millimeters (mm) and each of the first and second internal faces coated with the first and second electrodes has a dioptric defect score, expressed in millidioptres, of less than or equal to 2+2E/3, where the thickness E of the layer containing liquid crystals is in μm.

2. The multiple glazing with variable scattering by liquid crystals according to claim 1, characterized in that
    when the average thickness E is less than 8 μm, at least one of the first and second float glass sheets has a thickness of between 4.5 mm and 5.5 mm inclusive of these values, and
    when the average thickness E is greater than or equal to 8 μm, at least one of the first and second float glass sheets has a thickness between 2.5 mm and 5.5 mm inclusive of these values.

3. The multiple glazing with variable scattering by liquid crystals according to claim 2, characterized in that
    when the average thickness E is less than 8 μm, both of the first and second float glass sheets have a thickness of between 4.5 mm and 5.5 mm inclusive of these values, and
    when the average thickness E is greater than or equal to 8 μm, both of the first and second float glass sheets have a thickness between 2.5 mm and 5.5 mm inclusive of these values.

4. The multiple glazing with variable scattering by liquid crystals according to claim 1, characterized in that the joint has a given width L and is interrupted in its width by one or more openings, each of the one or more openings defining lateral joint ends.

5. The multiple glazing with variable scattering by liquid crystals according to claim 4, wherein the joint is made of a joint material and, for each of the one or more openings, an additional material forms a bridge between lateral ends of the joint, the bridge comprising a same material as the joint material, thus providing material continuity.

6. The multiple glazing with variable scattering by liquid crystals according to claim 5, characterized in that the joint material and the additional material each comprises an epoxy resin.

7. The multiple glazing with variable scattering by liquid crystals according to claim 4, characterized in that the joint is interrupted in its width by at least two openings facing a first edge of the multiple glazing and by at least two other openings facing a second edge of the multiple glazing opposite the first edge.

* * * * *